United States Patent
Inaba et al.

(10) Patent No.: US 10,798,284 B2
(45) Date of Patent: Oct. 6, 2020

(54) IMAGE PROCESSING APPARATUS AND METHOD

(71) Applicant: Sony Corporation, Tokyo (JP)

(72) Inventors: Seijiro Inaba, Kanagawa (JP); Legong Sun, Tokyo (JP); Yoichiro Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/578,996

(22) PCT Filed: Jun. 23, 2016

(86) PCT No.: PCT/JP2016/068676
§ 371 (c)(1),
(2) Date: Dec. 1, 2017

(87) PCT Pub. No.: WO2017/006772
PCT Pub. Date: Jan. 12, 2017

(65) Prior Publication Data
US 2018/0146129 A1    May 24, 2018

(30) Foreign Application Priority Data

Jul. 7, 2015   (JP) .................................. 2015-135848

(51) Int. Cl.
*H04N 5/232* (2006.01)
*H04N 5/222* (2006.01)
(Continued)

(52) U.S. Cl.
CPC .......... *H04N 5/23212* (2013.01); *G02B 7/28* (2013.01); *H04N 5/2226* (2013.01);
(Continued)

(58) Field of Classification Search
CPC ............ H04N 5/23212; H04N 5/2226; H04N 5/23216; H04N 5/232; H04N 5/272; H04N 5/23293; G02B 7/28; G03B 13/36
See application file for complete search history.

(56) References Cited

U.S. PATENT DOCUMENTS

| | | | |
|---|---|---|---|
| 2009/0003652 A1* | 1/2009 | Steinberg | G06K 9/00 382/103 |
| 2011/0001831 A1* | 1/2011 | Noguchi | H04N 5/232 348/169 |

(Continued)

FOREIGN PATENT DOCUMENTS

| | | |
|---|---|---|
| JP | 2009-086030 A | 4/2009 |
| JP | 2011-044838 A | 3/2011 |

OTHER PUBLICATIONS

Japan Office Action dated Mar. 17, 2020 for corresponding Japanese Application No. 2017-527170.

*Primary Examiner* — Lin Ye
*Assistant Examiner* — John H Morehead, III
(74) *Attorney, Agent, or Firm* — Michael Best & Friedrich LLP

(57) ABSTRACT

The present disclosure relates to an image processing apparatus and method that enables to correctly obtain an area of a main object at the time of auto focusing.

A control block selects a local focus area from information of a taken image and supplies designated focus position information indicative of the selected local focus area to an image processing block. The image processing block executes a control operation related with focusing on the basis of object area information indicative of an area corresponding to two or more objects within an image and designated focus position information indicative of a des- (Continued)

ignated focus position in this image. The present disclosure is applicable to an imaging apparatus, for example.

19 Claims, 16 Drawing Sheets

(51) Int. Cl.
*H04N 5/272* (2006.01)
*G02B 7/28* (2006.01)

(52) U.S. Cl.
CPC ..... *H04N 5/23216* (2013.01); *H04N 5/23218* (2018.08); *H04N 5/232127* (2018.08); *H04N 5/232933* (2018.08); *H04N 5/23293* (2013.01); *H04N 5/272* (2013.01)

(56) References Cited

U.S. PATENT DOCUMENTS

| | | | | |
|---|---|---|---|---|
| 2013/0163813 A1* | 6/2013 | Shoji | ............... | G06T 11/60 382/103 |
| 2014/0341425 A1* | 11/2014 | Babacan | ............ | G06K 9/00228 382/103 |
| 2015/0103232 A1* | 4/2015 | Hamano | ............ | H04N 5/23212 348/349 |
| 2015/0117784 A1* | 4/2015 | Lin | ............... | G06K 9/4671 382/195 |

* cited by examiner

FIG.15
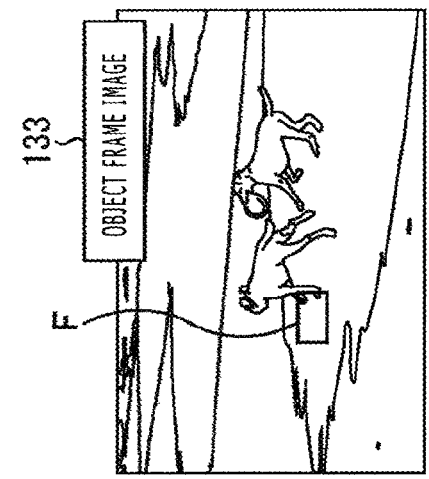
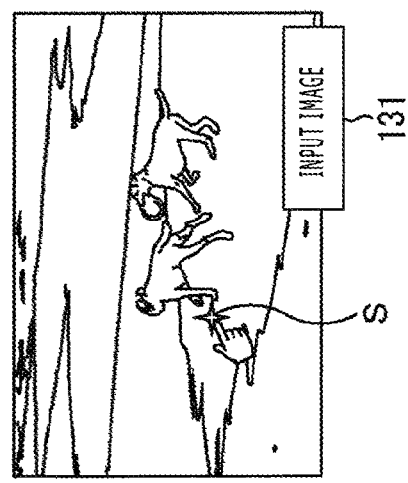

IMAGE PROCESSING APPARATUS AND METHOD

TECHNICAL FIELD

The present disclosure relates to an image processing apparatus and an image processing method and, more particularly, to an image processing apparatus and an image processing method that are configured to correctly obtain a main object area in auto focusing.

BACKGROUND ART

For a technology of automatic focusing of cameras (an autofocus function (AF)), a technique is known in which focus bracket imaging is executed on the basis of focus evaluation values (refer to Patent Literature 1 below).

CITATION LIST

Patent Literature

[PTL 1]
 JP 2009-86030A

SUMMARY

Technical Problem

However, technologies that allow the correct focusing on the object of image taking intended by image-taking person under more variable imaging conditions are desired.

Therefore, in consideration of the situations mentioned above, the present disclosure provides more correct auto focusing.

Solutions to Problem

In carrying out the present disclosure and according to one aspect thereof, there is provided an image processing apparatus. This image processing apparatus includes an image processing block configured to control related with focusing on the basis of object area information indicative of an area corresponding to a plurality of objects in an image and designated focus position information indicative of a designated focus position in the image.

The plurality of objects may include a main object and a background.

The plurality of objects may include at least two similar objects.

The image processing block may execute processing of estimating a background area as the processing related with focusing.

The image processing block may identify the designated focus position as the processing related with focusing.

If the designated focus position is positioned in a background area, the image processing block may correct the designated focus position to be an area of a main object among the plurality of objects as the processing related with focusing.

The image processing block may generate an object frame that encloses an area of the designated focus position as the processing related with focusing.

This image processing apparatus may further include an area partition block configured to partition an input image into areas related with the plurality of objects on the basis of color boundary.

The object area information is indicative of an area related with the plurality of objects in the image partitioned by color boundary.

The designated focus position information is indicative of a position of a point included in a local focus area selected in the image.

In carrying out the present disclosure and according to another aspect thereof, there is provided an image processing method. This image processing method includes executing, by an image processing apparatus, processing related with focusing on the basis of object area information indicative of an area corresponding to a plurality of objects in an image and designated focus position information indicative of a designated focus position in the image.

In one aspect of the present disclosure, processing related with focusing is executed on the basis of object area information indicative of an area corresponding to a plurality of objects in an image and designated focus position information indicative of a designated focus position in the image.

Advantageous Effect of Invention

According to one aspect of the present disclosure, a main object area can be correctly obtained especially in auto focusing.

It should be noted that the effect described herein are illustrative only and therefore not restricted thereto; namely, there may be additional advantageous effects.

BRIEF DESCRIPTION OF DRAWINGS

FIG. 15 is a diagram illustrating an object frame image generated by a related-art method for the description of the effect of the present technology.

DESCRIPTION OF EMBODIMENTS

The following describes modes (hereafter referred to as embodiments) for practicing the present disclosure.

Imaging Apparatus based on Present Technology

Figure 1:
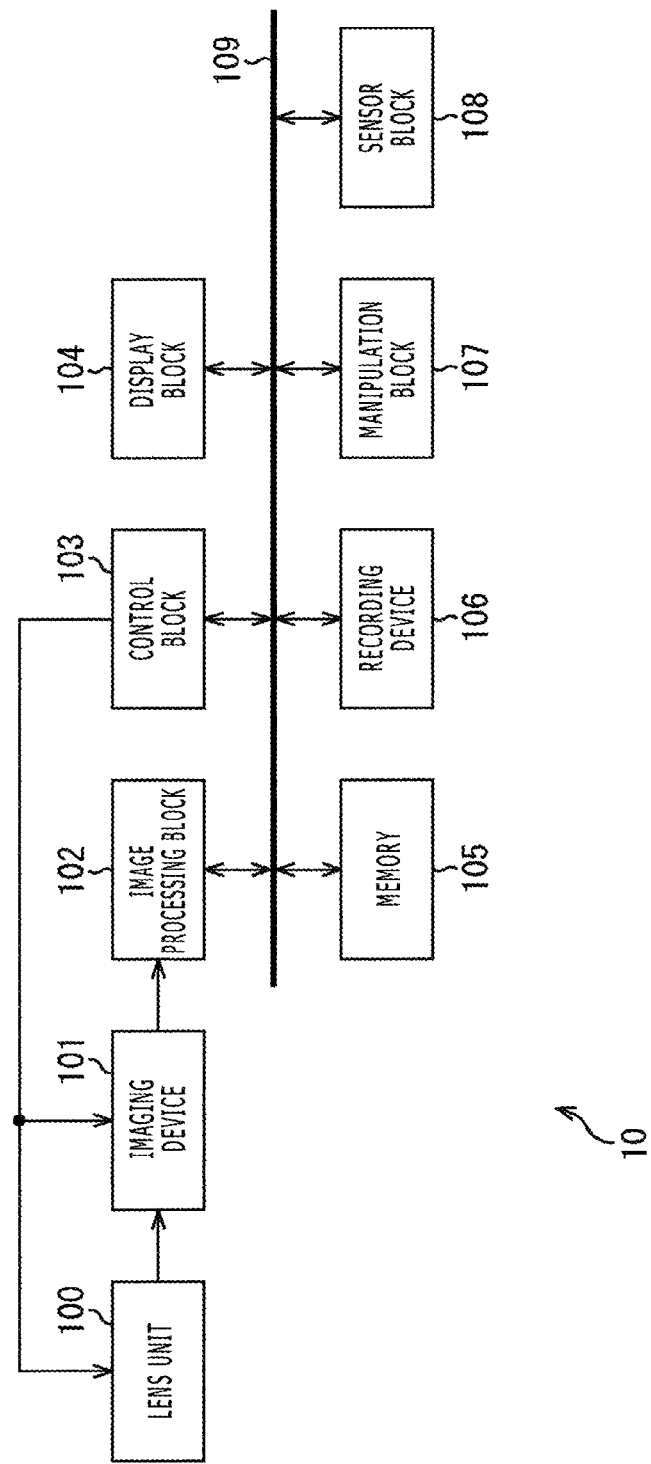
FIG. 1 is a block diagram illustrating an example of a configuration of an imaging apparatus to which the present technologies is applied.

Now, FIG. 1 is a block diagram illustrating a configuration of an example of an imaging apparatus to which the present technology is applied.

The imaging apparatus 10 depicted in FIG. 1 includes a lens unit 100, an imaging device 101, an image processing block 102, a control block 103, a display block 104, a memory 105, a recording device 106, a manipulation block 107, a sensor block 108, and a bus 109.

The lens unit 100 condenses a light image of an object to be taken. The lens unit 100 has a mechanism to adjust a focus lens and apertures on the basis of an instruction from the control block 103 so as to obtain a proper image.

The imaging device 101 photoelectrically converts a light image condensed by the lens unit 100 into an electrical signal. To be specific, the imaging device 101 is realized by a CCD (Charge Coupled Device) image sensor or a CMOS (Complementary Metal Oxide Semiconductor) image sensor, for example.

The image processing block 102, the control block 103, the display block 104, the memory 105, the recording device 106, the manipulation block 107, and the sensor block 108 are interconnected by the bus 109.

The image processing block 102 includes a sampling circuit for sampling an electrical signal received from the imaging device 101, an analog-to-digital (A/D) conversion circuit for converting an analog signal into a digital signal, an image processing circuit for executing predetermined image processing on a digital signal, and the like. The image processing block 102 has not only dedicated hardware circuits but also a CPU (Central Processing Unit) and a DSP (Digital Signal Processor), thereby executing software processing in order to handle flexible image processing.

Especially, the image processing block 102 divides an image into areas and, on the basis of the information about local focus area received from the control block 103, executes focusing-related processing (such processing as background estimation, starting point correction, area coupling, and object frame generation). It should be noted that the detail of the processing to be executed by the image processing block 102 will be described later.

The control block 103 includes a CPU (Central Processing Unit) and a control program and controls each of the blocks of the image processing apparatus. The control program itself is actually stored in the memory 105 and is executed by the CPU. Especially, the control block 103 selects a local focus area from taken image information and drives a focus lens of the lens unit 100 on the basis of a focus target position (depth) in the selected local focus area and a focus position (depth) of the lens unit 100. Further, the control block 103 supplies designated focus position information indicative of the selected local focus area to the image processing block 102.

The display block 104 includes a D/A conversion circuit for converting an image signal processed by the image processing block 102 and stored in the memory 105 into an analog signal, a video encoder for encoding the analog video signal into a video signal having format compatible with a display apparatus in a subsequent stage, and a display apparatus for displaying an image corresponding to the entered video signal. The display apparatus is realized by an LCD (Liquid Crystal Display) and the like, for example, and also functions as a finder.

The memory 105 includes a semiconductor memory such as a DRAM (Dynamic Random Access Memory) in which image data processed by the image processing block 102, a control program in the control block 103, and various kinds of data are stored in a temporary manner.

The recording device 106 includes a semiconductor memory such as a flash memory, a magnetic disc, an optical disc, a magneto-optical disc or the like. At the time of imaging, a taken image is encoded by the image processing block 102 into JPEG (Joint Photographic Experts Group) format and stored in the memory 105 to be recorded to a recording medium. At the time of reproduction, the JPEG image is read from the recording medium into the memory 105 to be decoded by the image processing block 102.

The manipulation block 107 includes input devices such as a hardware key like a shutter button, a manipulation dial, and a touch panel and detects an input manipulation by an image-taking person, an operation of the image processing apparatus being determined by a control operation by the control block 103.

The sensor block 108 includes a gyro sensor, an acceleration sensor, a geomagnetic sensor, a GPS (Global Positioning System) sensor, for example, thereby detecting various kinds of information. These pieces of information are added to the taken image data as metadata and, at the same time, used for various kinds of image processing and control processing.

Figure 2:
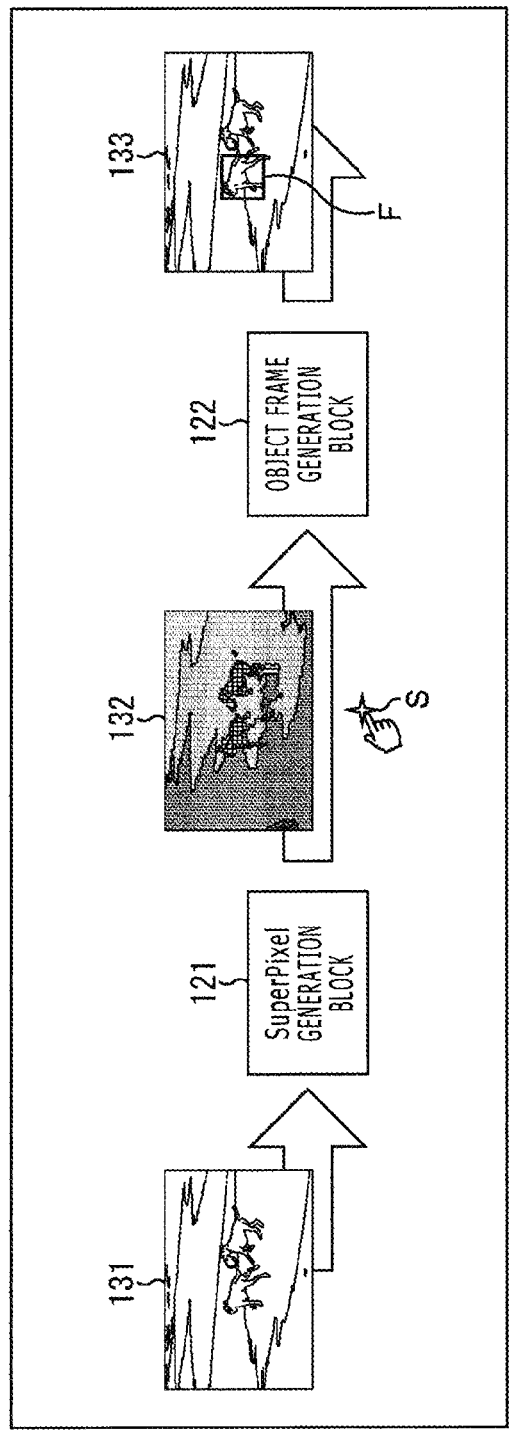
FIG. 2 is a block diagram illustrating an example of a configuration of functional blocks that are executed by an image processing block.

FIG. 2 is a block diagram illustrating an example of a configuration of functional blocks that are executed by the image processing block 102.

The functional block depicted in FIG. 2 includes a SuperPixel generation block 121 and an object frame generation block 122. Finger and star icons in the example depicted in FIG. 2 are indicative of an initial point (starting point) S that is entered as designated focus position information indicative of a local focus area received from the control block 103 and included in this local focus area. The initial point includes a point at approximate the center of a local focus area, for example. It should be noted that a local focus area may be a focus point. Therefore, designated focus position information may be the position information of a local focus area or the position information of that initial point.

An input image 131 is entered in the SuperPixel generation block 121 from the imaging device 101. The SuperPixel generation block 121 executes SuperPixel generation processing. That is, the SuperPixel generation block 121 explicitly area-partitions the input image 131 by color boundary so as to generate an intermediately processed image (a SuperPixel image) 132 by use of a SuperPixel generation technology. The SuperPixel generation block 121 outputs the generated intermediately processed image 132 to the object frame generation block 122.

It should be noted that, generally, at the boundaries of an object, there are frequently different colors. Therefore, in the intermediately processed image 132 that is generated by the SuperPixel generation processing that groups pixels by color, an area of colors related with a main object may be an area of an object different from an area of similar colors of colors related with the main object. That is, it can be said that the intermediately processed image 132 is partitioned into areas related with two or more objects by the SuperPixel generation processing and has object area information indicative of areas related with two or more objects.

The designated focus position information indicative of the initial point (starting point) S included in a local focus area is entered into the object frame generation block 122 from the control block 103. The object frame generation block 122 enters the intermediately processed image 132 having object area information and, on the basis of the designated focus position information indicative of the starting point S and the entered object area information, executes the processing related with focusing (such processing as background estimation, starting point correction, area coupling, and object frame generation), thereby outputting an image (referred to as an object frame image) 133 indicative of an object frame F to the display block 104, for example. In response, the display block 104 displays the image 133 indicative of the object frame F.

In addition, the object frame generation block 122 may supply the information about a corrected starting point or the information about the starting point with correction not required to the control block 103 as the designated focus position information. At this moment, the control block 103 drives the focus lens of the lens unit 100 by a focus target position (depth) based on the designated focus position information received from the object frame generation block 122.

Figure 3:
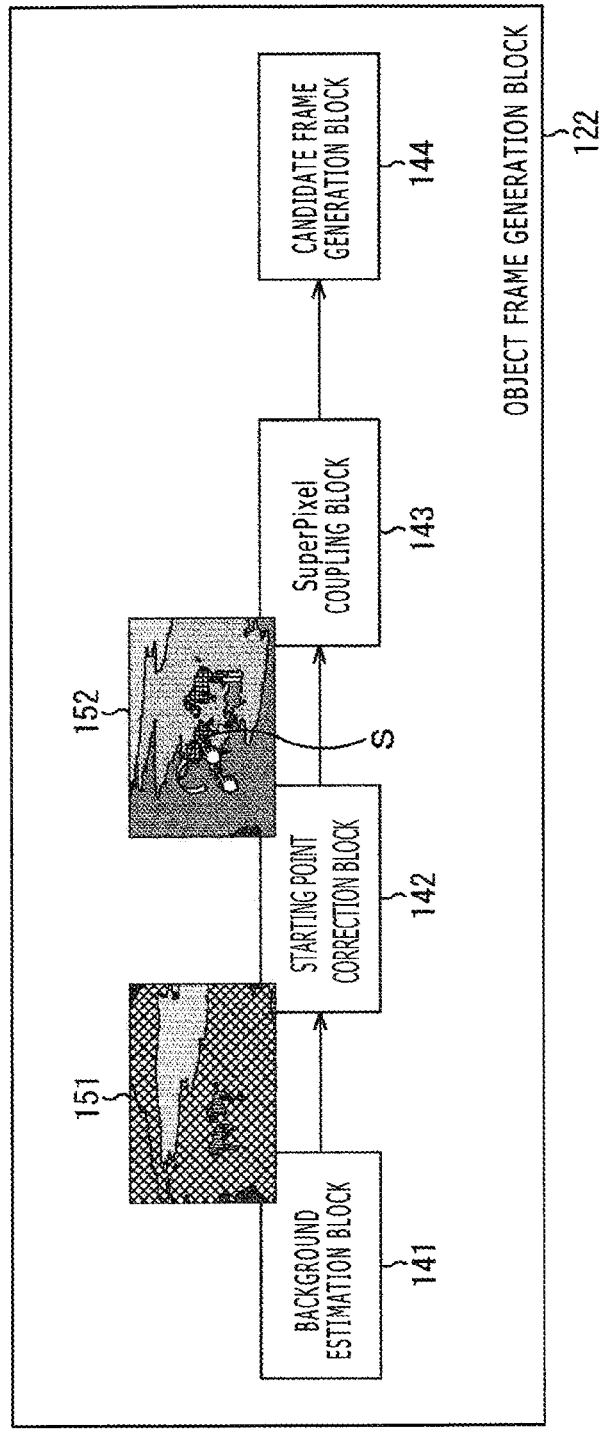
FIG. 3 is a block diagram illustrating an example of a configuration of an object frame generation block.

FIG. 3 is a block diagram illustrating an example of a configuration of an object frame generation block.

In the example depicted in FIG. 3, the object frame generation block 122 includes a background estimation block 141, a starting point correction block 142, a SuperPixel coupling block 143, and a candidate frame generation block 144.

As described above, a background estimation image 151 is partitioned into areas of two or more objects. The two or more objects may include two or more objects that are similar to each other. Further, the two or more objects include a main object that is to be focused and a background. The background estimation block 141 estimates a background area from areas of two or more objects in the intermediately processed image 132 and supplies the background estimation image 151 (the cross-hatched area provides the background section) that is an image with the background estimated to the starting point correction block 142.

The starting point correction block 142 identifies an area in which the starting point S is positioned in the background estimation image 151 and, if the identified area is the background area, corrects the starting point S on the main object in object reliability. The starting point correction block 142 supplies a starting point corrected image 152 that is an image ended with starting point correction to the SuperPixel coupling block 143.

The SuperPixel coupling block 143 couples SuperPixels that are near each other in color distance or space distance and supplies an image with SuperPixels coupled to the candidate frame generation block 144. The candidate frame generation block 144 generates a candidate frame that encloses an area in which the starting point S is positioned, namely, the SuperPixel of a main object is included and outputs the generated candidate frame as an object frame F.

Figure 4:
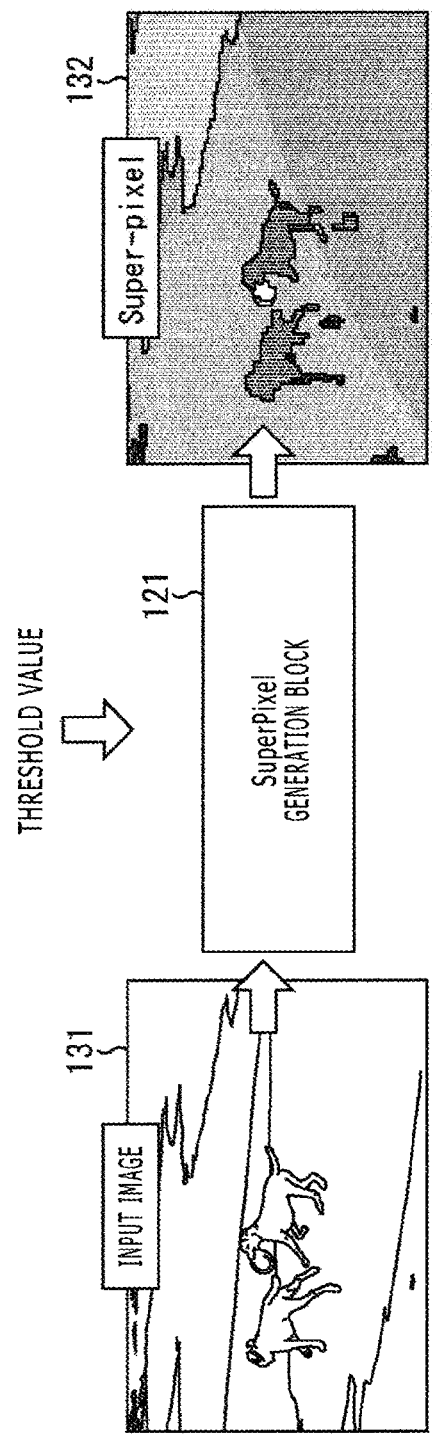
FIG. 4 is a diagram for describing the processing of a SuperPixel generation block.

FIG. 4 is a diagram for describing the processing to be executed by the SuperPixel generation block.

The SuperPixel generation block 121 generates a SuperPixel (pixel group) by grouping similar colors by use of a threshold value for the input image 131 and outputs an image with two or more SuperPixels generated, namely, the area-partitioned intermediately processed image 132 to the object frame generation block 122.

Figure 5:
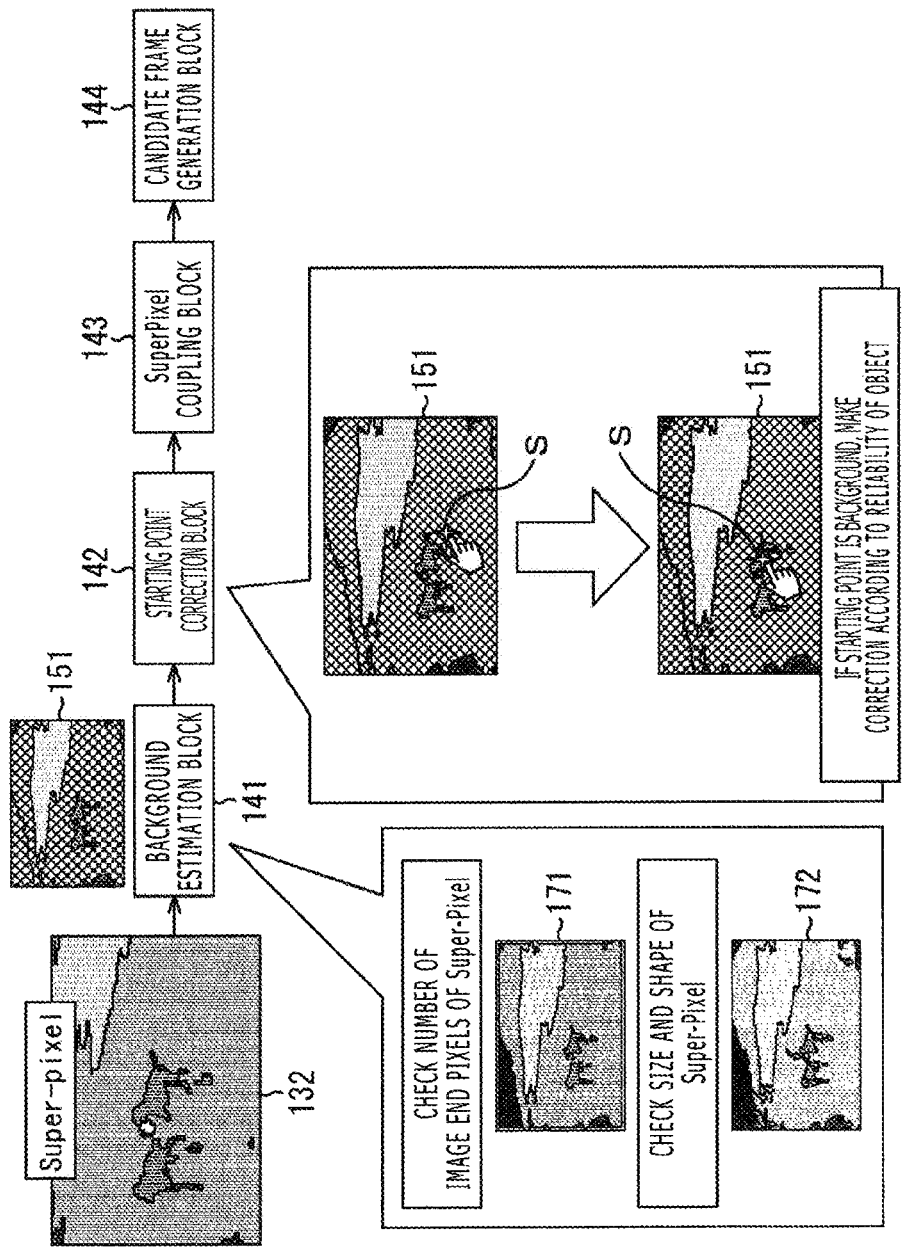
FIG. 5 is a diagram for describing the processing of the object frame generation block.

FIG. 5 is a diagram for describing the processing to be executed by the object frame generation block.

In the intermediately processed image 132, the background estimation block 141 checks the number of image end pixels of SuperPixels and checks the size and shape of SuperPixels so as to estimate a background area from two or more object areas, thereby outputting the background estimation image 151 with a background estimated to the starting point correction block 142.

If the starting point S is positioned in an area, which is a background of the background estimation image 151, the starting point correction block 142 obtains an object reliability indicative of a degree of reliability of an object for each SuperPixel and corrects the starting point S in accordance with the obtained object reliability.

In the background estimation image 151 with the starting point S corrected as required, the SuperPixel coupling block 143 couples the SuperPixels that are near each other in color distance or space distance and supplies the image with the SuperPixels coupled to the candidate frame generation block 144.

Figure 6:
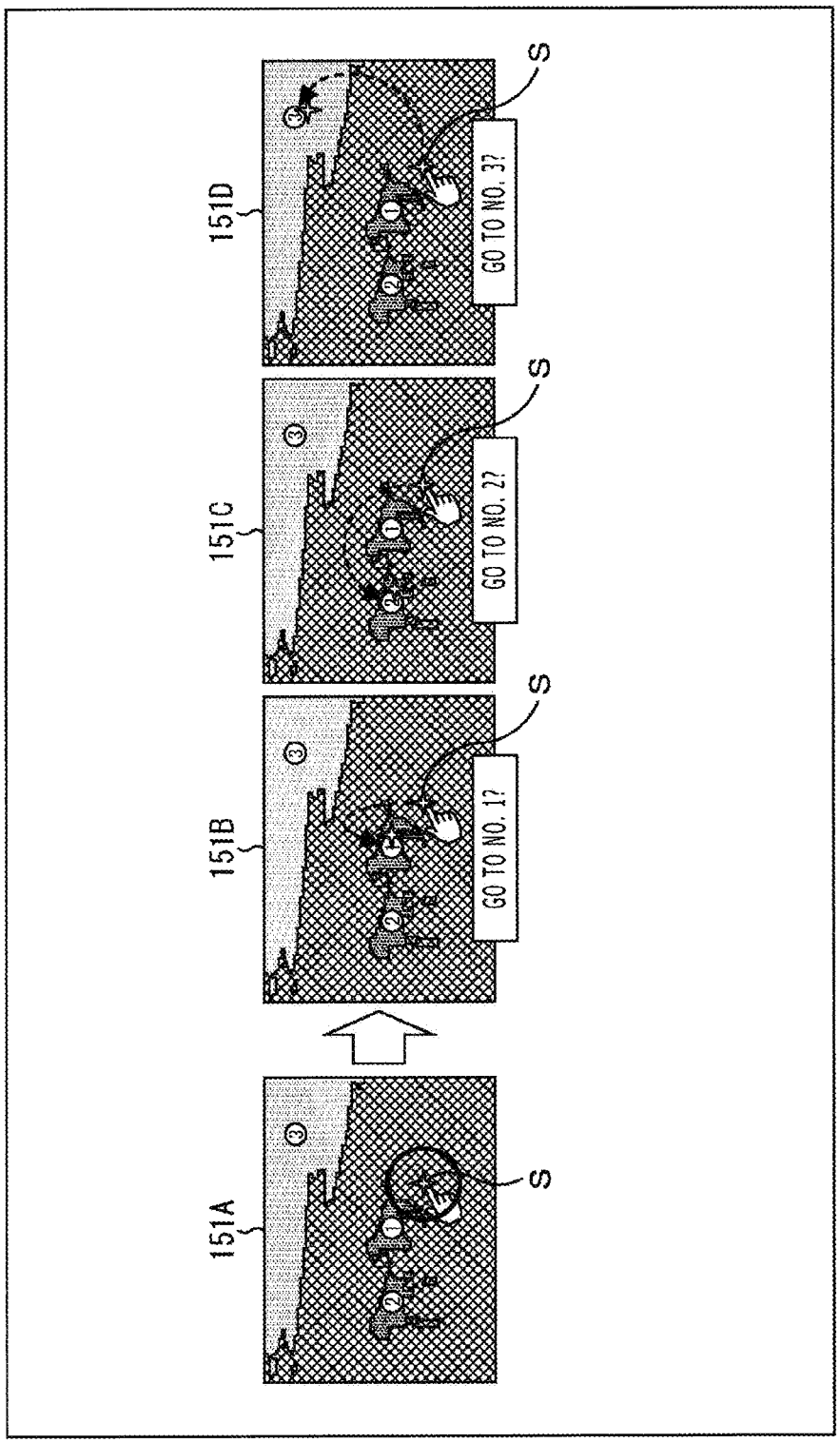
FIG. 6 is a diagram for describing the correction of a starting point.

FIG. 6 is a diagram for describing the correction of a starting point.

As depicted in FIG. 6, if the starting point S (the star mark in the diagram) is positioned at a SuperPixel estimated as a background, the starting point correction block 142 makes the starting point S jump to a SuperPixel other than the background and then corrects the starting point.

For example, in a background estimation image 151A, since the starting point S is found at a SuperPixel estimated to be a background (cross-hatched section), the starting point S is moved to SuperPixels (1, 2, and 3) other than background as depicted in background images 151B through 151D. This movement is executed in accordance with an object reliability described next.

Figure 7:
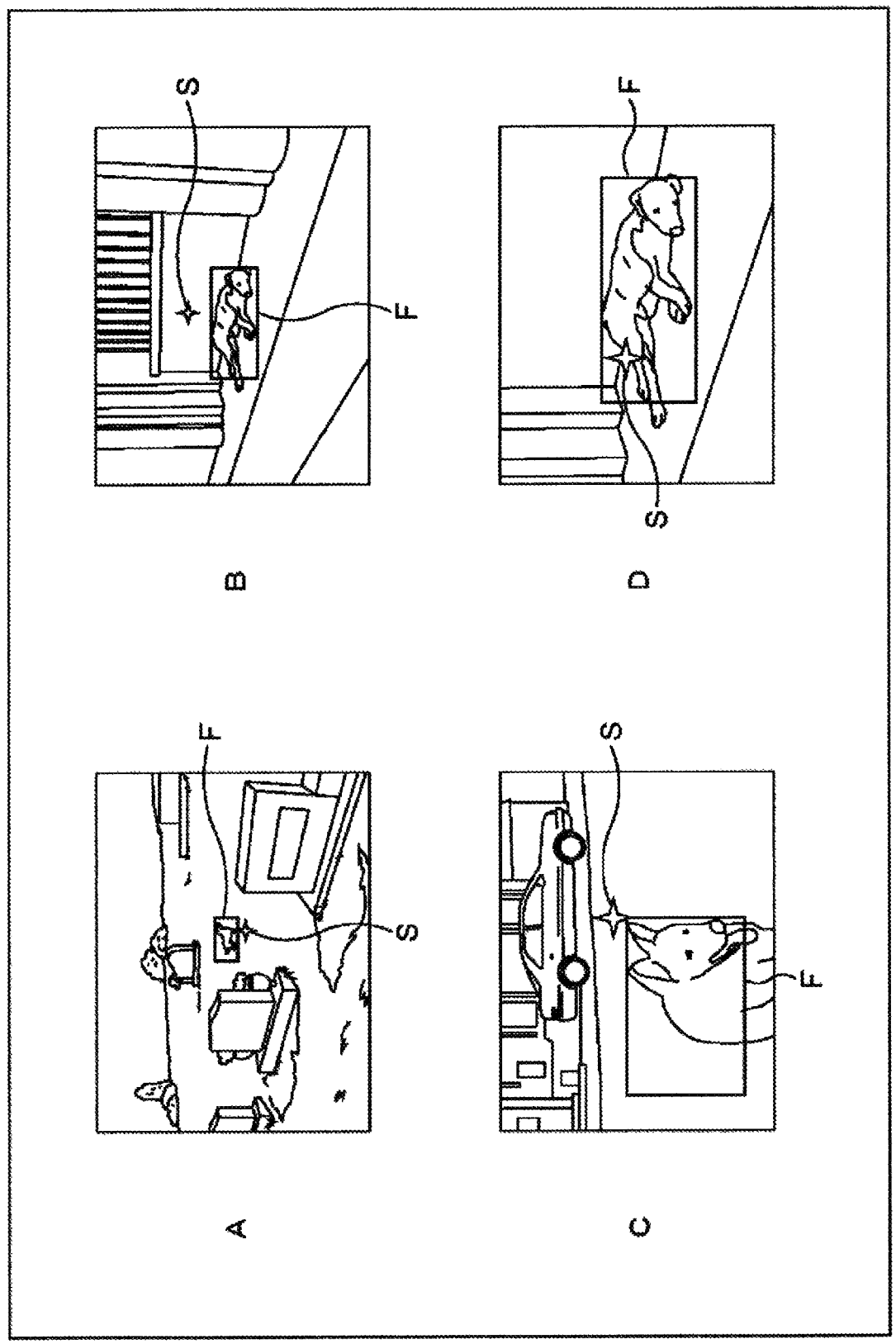
FIG. 7A through 7D are diagrams for describing the object reliability of a SuperPixel to be processed.

FIG. 7 are diagrams for describing the object reliability of a SuperPixel to be processed. In the example depicted in FIG. 7, S is indicative of the starting point and the SuperPixel to be processed is indicated by an object frame F. It should be noted that in A of FIG. 7, except for a dog at center and gravestones is a background area. In B of FIG. 7, except for a dog at center and a window fence above the dog is a background area. In C of FIG. 7, except for a dog and a car is a background area. In D of FIG. 7, except for a dog is a background area.

When the starting point is in the SuperPixel of a background area, the starting point correction block 142 selects a SuperPixel to be processed from the following factors.

A: As depicted in A of FIG. 7, a SuperPixel with the space distance being near from the starting point is regarded as being high in main object reliability.

B: As depicted in B of FIG. 7, a SuperPixel with the space distance being near from a focus area center (the center of the image here) is regarded as being high in main object reliability.

C: As depicted in C of FIG. 7, a SuperPixel with color distance being away from background is preferable.

C-1: A SuperPixel with the color distance separated away from the SuperPixel (regarded as background) in which the starting point exists is regarded to be high in main object reliability.

C-2: A SuperPixel with the color distance separated away from the maximum size of SuperPixel in the background area is regarded as being high in main subject reliability.

D: As depicted in D of FIG. 7, a SuperPixel having a large area is regarded to be high in main object reliability.

On the basis of at least one or a combination of the above-mentioned factors, the SuperPixel to be processed is selected.

Figure 8:
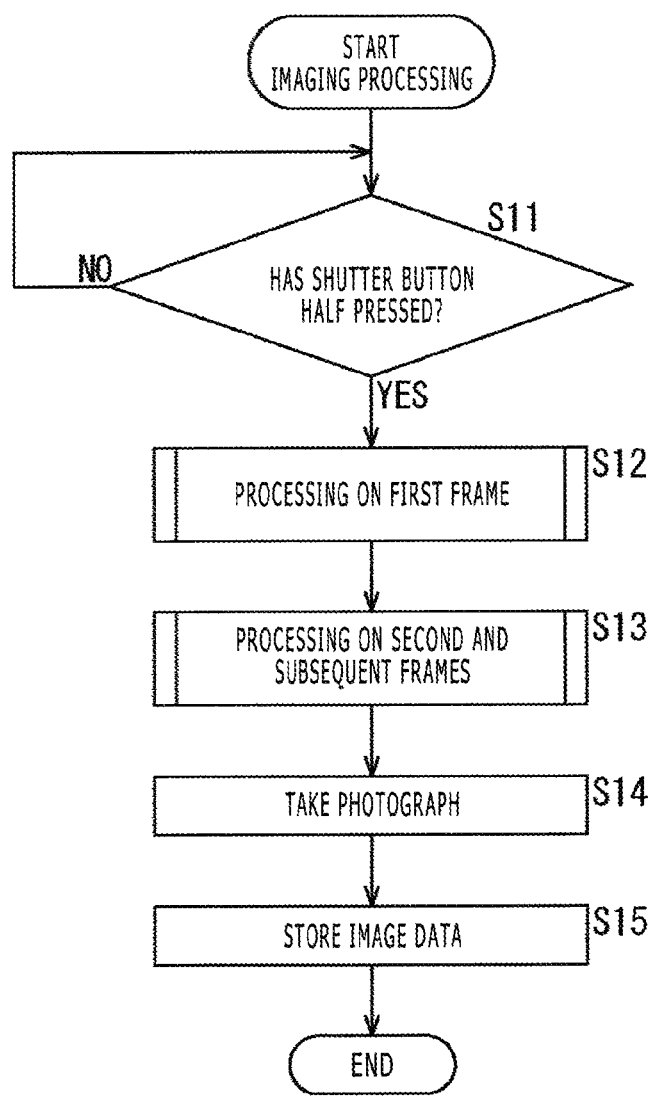
FIG. 8 is a flowchart indicative of the imaging processing by the imaging apparatus to which present technology is applied.

The following describes the imaging processing to be executed by the imaging apparatus 10 depicted in FIG. 1 with reference to a flowchart depicted in FIG. 8.

In step S11, if the control block 103 of the imaging apparatus 10 waits until a shutter button making up the manipulation block 107 is half pressed and, upon determination that the shutter button has been half pressed, the processing goes to step S12.

In step S12, the image processing block 102 and the control block 103 execute the processing on the first frame. This processing captures an object in accordance with a local focus area, which will be described later with reference to FIG. 9.

In step S13, the image processing block 102 and the control block 103 execute the processing on the second and subsequent frames. This processing traces an object, which will be described later with reference to FIG. 11.

An object frame F is displayed by the processing in steps S12 and S13 and the shutter button is fully pressed, so that the control block 103 controls the imaging device 101 so as to take photograph in step S14. The imaging device 101 photoelectrically converts an optical image condensed through the lens unit 100 into an electrical signal. The image processing block 102 samples the electrical signal received from the imaging device 101 and converts the sampled electrical signal into digital image data, thereby executing predetermined image processing.

In step S15, the image processing block 102 stores the image data into the memory 105.

Figure 9:
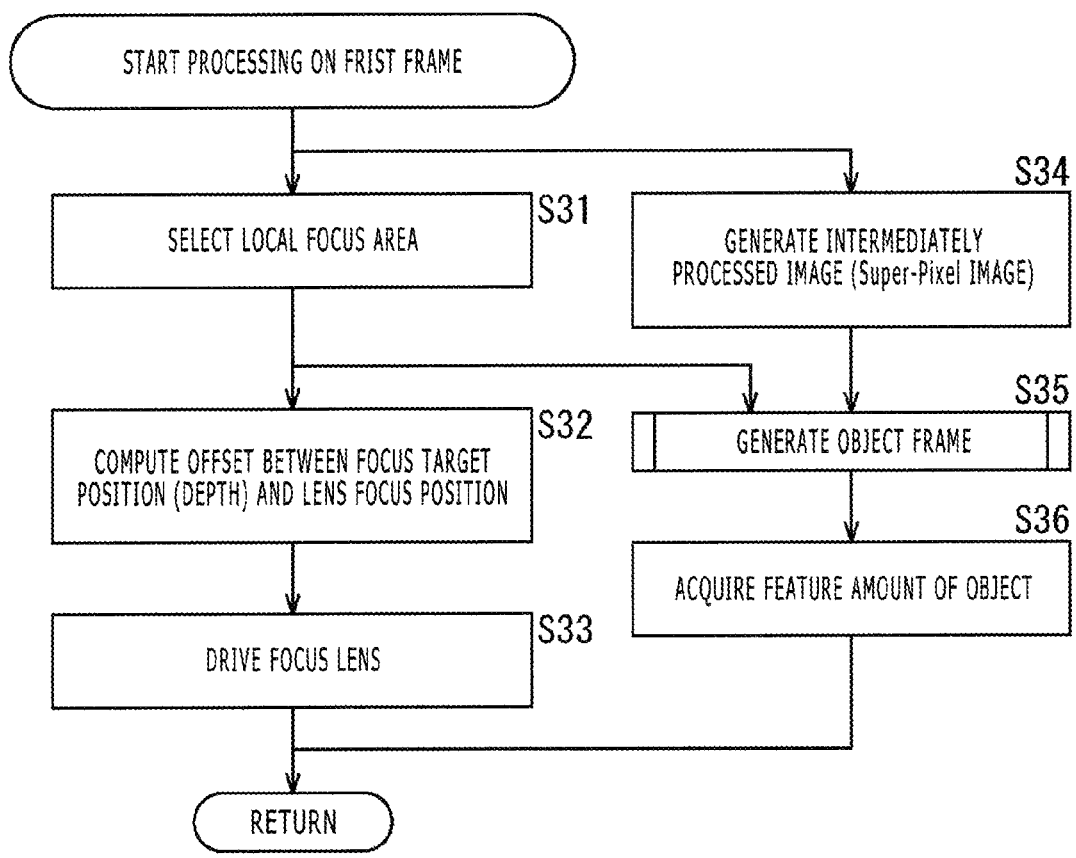
FIG. 9 is a flowchart indicative of the processing to be executed on a first frame.

The following describes the processing to be executed on the first frame in step S12 depicted in FIG. 8 with reference to FIG. 9. It should be noted that the processing of capturing an object is executed in the example depicted in FIG. 9.

When the shutter button is half pressed in step S11 depicted in FIG. 8, the information thereof is entered from the manipulation block 107 into the control block 103 and the image processing block 102. In addition, the input image 131 at that moment is entered from the imaging device 101 into the control block 103 and the image processing block 102.

In step S31, the control block 103 selects a local focus area from the input image 131. The designated focus position information indicative of the selected local focus area is supplied to the object frame generation block 122.

In step S32, the control block 103 computes an offset between a focus target position (depth) in the local focus area and a lens focus position (depth) on the basis of the designated focus position information. In step S33, the control block 103 drives the focus lens of the lens unit 100 on the basis of the offset computed in step S32.

On the other hand, in step S34, by use of a SuperPixel generation technology, the SuperPixel generation block 121 explicitly area-partitions the input image 131 entered from the input image 131 by color boundary so as to generate the intermediately processed image 132 (SuperPixel image) that is area-partitioned (with respect to two or more objects). The SuperPixel generation block 121 outputs the generated intermediately processed image 132 to the object frame generation block 122.

In step S35, the object frame generation block 122 generates an object frame F on the basis of the intermediately processed image 132 having object area information received from the SuperPixel generation block 121 and the designated focus position information of the local focus area (starting point) S received from the control block 103. This object frame generation processing will be described later with reference to FIG. 10. The object frame image 133 generated in step S35 is displayed on the display block 104.

In step S36, a feature amount acquisition block (not depicted) of the image processing block 102 acquires a feature amount of an object. Here, the acquired object feature amount and the designated focus position information of a starting point are used in the processing for the second and subsequent frames.

Thus, an object is captured in accordance with a local focus area, an object frame is generated, and the generated object frame is displayed on the display block 104.

Figure 10:
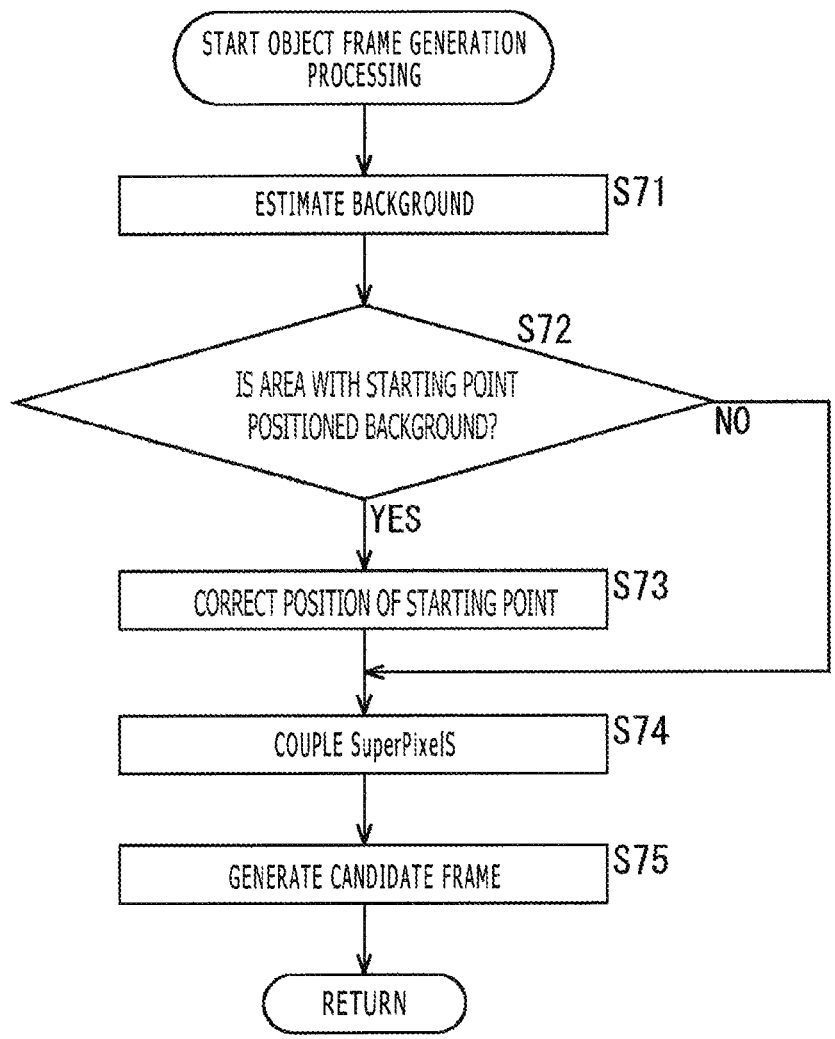
FIG. 10 is a flowchart indicative of object frame generation processing.

The following describes the object frame generation processing to be executed in step S35 depicted in FIG. 9 with reference to a flowchart depicted in FIG. 10.

In step S71, the background estimation block 141 estimates a background from the areas of two or more objects in the intermediately processed image 132 and supplies the background estimation image 151 (the cross-hatched section is the background section) that is the image estimated with the background area to the starting point correction block 142.

In step S72, the starting point correction block 142 identifies an area in which the starting point S is positioned on the basis of the designated focus position information and determines, in the background estimation image 151, whether or not the area in which the starting point S is positioned is a background. If the area in which the starting point S is positioned is found to be a background in step S72, then the processing goes to step S73.

In step S73, the starting point correction block 142 corrects the starting point S on the basis of the main object reliability described above with reference to FIG. 7. The starting point correction block 142 supplies the starting point corrected image 152 that is an image with starting point corrected to the SuperPixel coupling block 143. It should be noted that the object frame generation block 122 may be configured such that the information about the corrected starting point or the information about the starting point not requiring correction is supplied to the control block 103 as designated focus position information. At that moment, the control block 103 drives the focus lens of the lens unit 100 by a focus target position (depth) based on the designated focus position information received from the object frame generation block 122. Then, the processing goes to step S74.

If it is determined in step S72 that the area in which the starting point S is positioned is not a background, then the processing of step S73 is skipped and the processing goes to step S74.

In step S74, the SuperPixel coupling block 143 couples the SuperPixels that are near to each other in color distance or a space distance and supplies an image with the SuperPixels coupled to the candidate frame generation block 144.

In step S75, the candidate frame generation block 144 generates a candidate frame enclosing an area in which the starting point S is positioned, namely, the SuperPixel of the main object is included, and outputs the generated candidate frame as an object frame F.

As described above, since area separation is executed on a color boundary by use of a SuperPixel (area partition), objects having similar colors can be recognized as different objects. Consequently, an object frame can be correctly obtained. In addition, since the background determination is executed on an area by area basis, a local focus area can be corrected.

Figure 11:
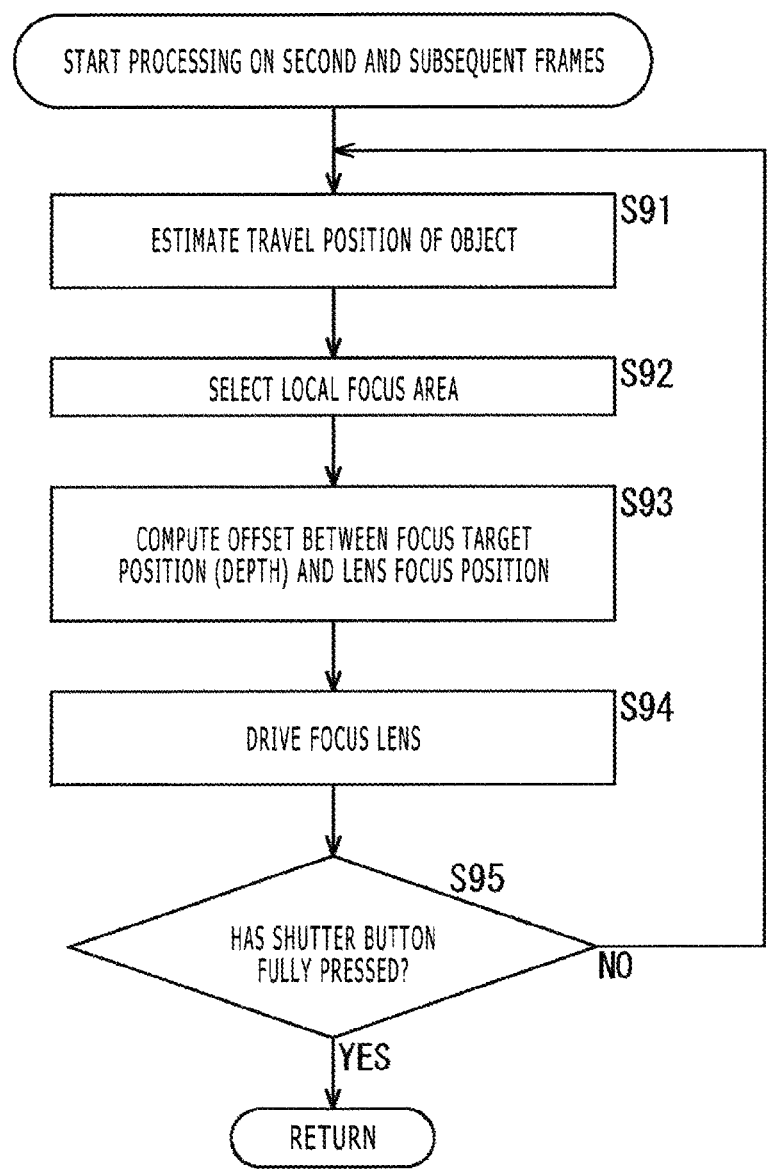
FIG. 11 is a flowchart indicative of the processing to be executed on the second and subsequent frames.

The following describes the processing to be executed on the second and subsequent frames in step S13 depicted in FIG. 8 with reference to a flowchart depicted in FIG. 11. It should be noted that, in the example depicted in FIG. 11, the processing tracing an object is executed.

In step S91, a movement position estimation block (not depicted) of the image processing block 102 estimates a movement position of an object.

In step S92, the control block 103 selects a local focus area on the basis of the movement position of the object estimated in step S91. In step S93, on the basis of the designated focus position information indicating the local focus area, the control block 103 computes an offset between a focus target position (depth) in the local focus area and a lens focus position (depth). In step S94, the control block 103 drives the focus lens of the lens unit 100 on the basis of the offset computed in step S93.

In step S95, the control block 103 determines whether or not the shutter button has fully pressed. If the user fully presses the shutter button, the manipulation block 107 supplies the information thereof to the control block 103. The control block 103 determines in step S95 that the shutter button has fully pressed and ends the processing on the second and subsequent frames.

On the other hand, if it is determined in step S95 to that the shutter button has not fully pressed, then the processing is returned to step S91 to repeat the processing therefrom.

Effect of Present Technology

The following describes the effect of the present technology with reference to FIG. 12 through FIG. 15.

With the present technology, areas can be explicitly separated on a color boundary (a boundary of objects) by use of the area partitioning (SuperPixel generation) technology, so that the objects having similar colors can be handled as different separate objects, thereby correctly obtaining the objects to be imaged.

Figure 12:
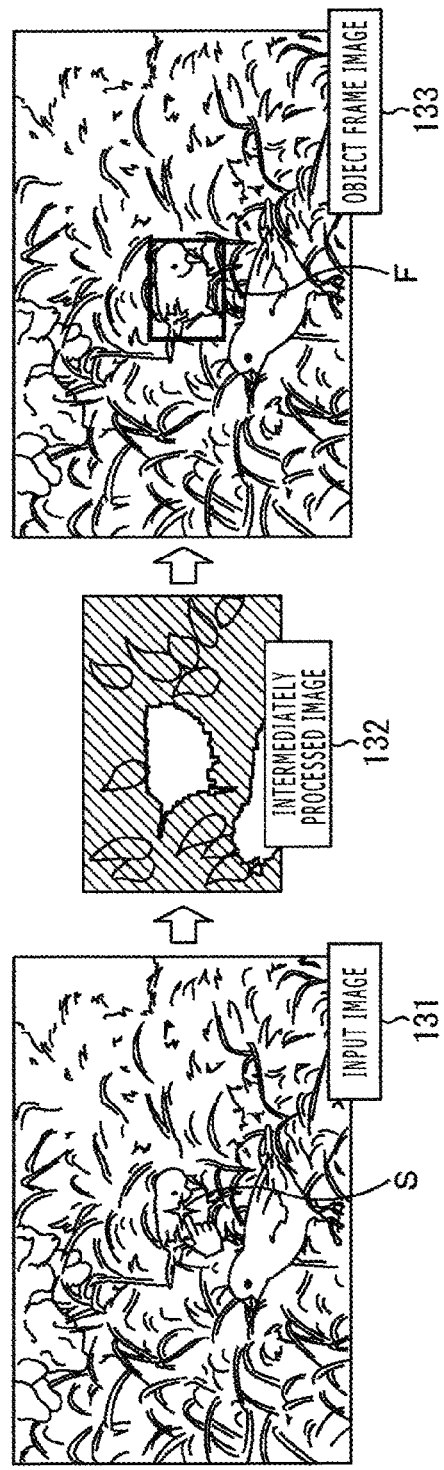
FIG. 12 is a diagram illustrating effect of the present technology.
Figure 13:
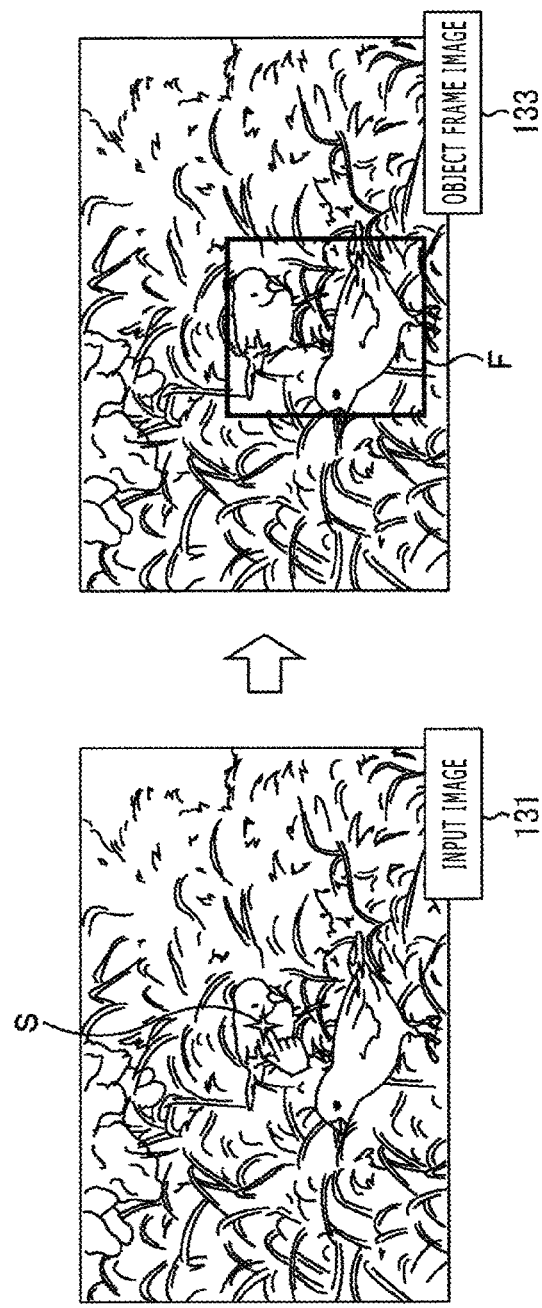
FIG. 13 is a diagram illustrating an object frame image generated by a related-art method for the description of effect of the present technology.

As depicted in FIG. 12, specifying a focus area (starting point) S only on an upper bird in the diagrams separates the area into two or more objects in the intermediately processed image 132 generated by the area partition technology. Accordingly, as depicted in the object frame image 133 the object frame F can be displayed so as to enclose only the upper bird in the diagrams. Therefore, as with the example depicted in FIG. 13, for example, even if the focus area (starting point) S is specified only on the upper bird in the diagrams, the object frame F can be prevented from resultantly enclosing the two birds, as depicted in the object frame image 133.

In addition, every area is determined whether or not the area is the background; if the starting point S is the background in a local focus area selection, then the focus area is corrected, so that an object targeted by an image-taking person can be captured even if the focus area is erroneously shifted to the background.

Figure 14:
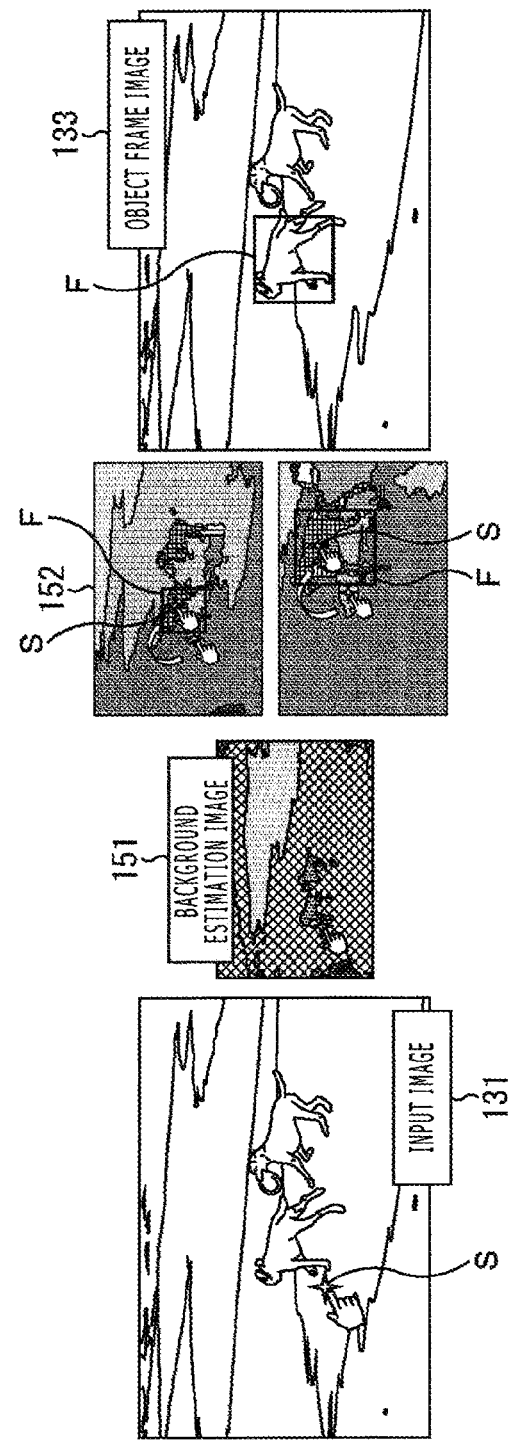
FIG. 14 is a diagram illustrating the effect of the present technology.

As depicted in FIG. 14, even if the starting point S is set to the background in the input image 131, the background is indicated as depicted in the background estimation image 151 and the starting point S is corrected as depicted in starting point corrected image 152. Therefore, in the object frame image 133, the object frame F can be displayed so as to enclose the dog targeted by an image-taking person. For example, as depicted in FIG. 15, even if the starting point S is set to the background, the object frame F can be prevented from getting out of the background.

As described above and according to the present technology, area separation is realized by the color boundary by use of a SuperPixel (area partition), so that objects of similar colors can be recognized as different objects, thereby allowing the focusing on an object targeted by an image-taking person. In addition, an object frame can be correctly obtained.

Further, even if there occurs an offset between an object targeted by an image-taking person and a designated focus point because of hand shaking or movement of the object, the targeted object can be surely focused.

It should be noted that, the above description is explained that the case of autofocus in which the initial point (starting point) of a local focus area is determined from the information of a taken image. It is also practicable to apply the present technology to the case in which a user specifies a focus position by execution button or touch panel manipulation on a desired point or a desired area of a live view image displayed on the display block 104, thereby determining the starting point.

In addition, user manipulation is not restricted to only button manipulation and touch panel manipulation; for example, manipulations can be accepted from other external manipulation devices (multi-function portable terminals or multi-function mobile phones, for example) through the communication block.

It should be noted that, in the above description, the processing operations up to the generation of an object frame are described; however, the processing operations are not restricted to the generation of an object frame. The present technology is also applicable to the case in which no object frame is displayed. For example, in the case of a monitor camera, the present technology is applicable to taking out an area for identifying a main object later.

Further, the present technology is applicable to image processing apparatuses, imaging apparatuses, monitor cameras, automobile cameras, and the like and video systems including these apparatuses and devices.

Personal Computer

The sequence of processing operations described above can be executed by hardware or software. In the execution of the sequence of processing operations by software, the programs making up this software are installed on a computer. Here, the computer includes one that is built in dedicated hardware or a general-purpose personal computer capable of execution various kinds of functions by installing various kinds of programs.

Figure 16:
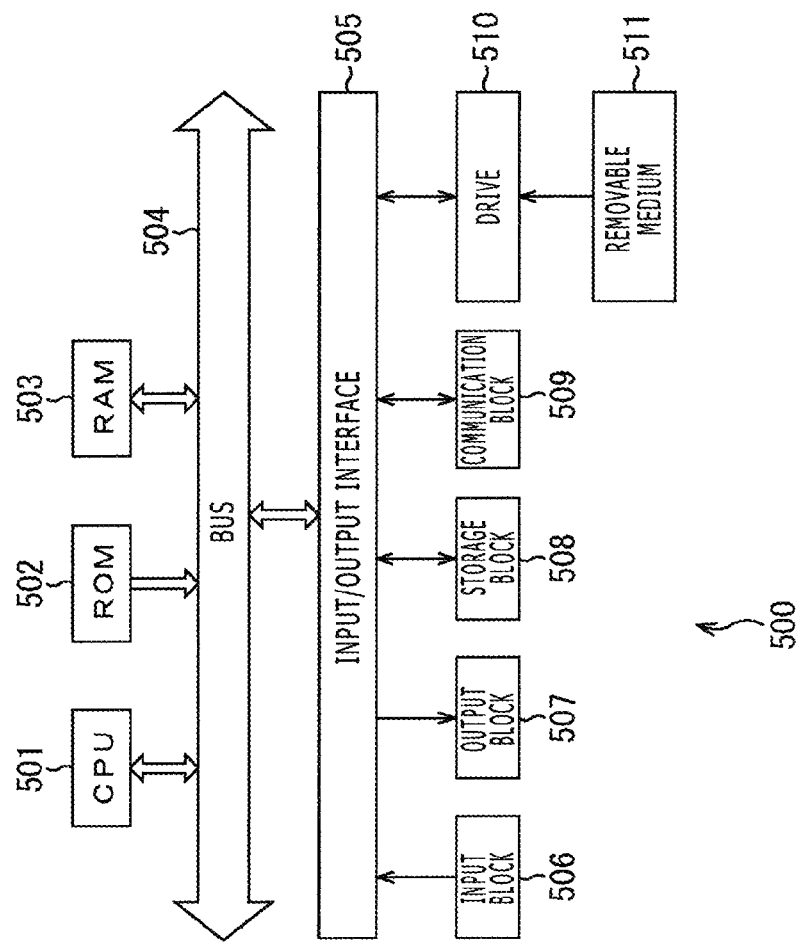
FIG. 16 is a block diagram illustrating an example of a main configuration of a personal computer.

FIG. 16 is a block diagram illustrating an example of a configuration of hardware of a personal computer that executes the above-mentioned sequence of processing operations by programs.

In a personal computer 500, a CPU (Central Processing Unit) 501, a ROM (Read Only Memory) 502, and a RAM (Random Access Memory) 503 are interconnected through a bus 504.

The bus 504 is further connected to an input/output interface 505. The input/output interface 505 is connected to an input block 506, an output block 507, a storage block 508, a communication block 509, and a drive 510.

The input block 605 includes a keyboard, a mouse, a microphone and so on. The output block 507 includes a display, a speaker, and so on. The storage block 508 includes a hard disc drive, a nonvolatile memory, and so on. The communication block 509 includes a network interface and so on. The drive 510 drives removable medium 511 such as a magnetic disc, an optical disc, a magneto-optical disc, a semiconductor memory, or the like.

In the personal computer 500 configured as described above, the CPU 501 loads programs from the storage block 508 into the RAM 503 through the input/output interface 505 and the bus 504 so as to execute the programs, for example. Consequently, the above-mentioned sequence of processing operations is executed.

Programs to be executed by the computer (or the CPU 501) are provided as recorded in the removable medium 511. The removable medium 511 is, for example, package media and the like including a magnetic disc (including a flexible disc), an optical disc (CD-ROM (Compact Disc Read-Only Memory), a DVD (Digital Versatile Disc), and the like), a magneto-optical disc, or a semiconductor memory. Alternatively, the programs can be provided through wired or wireless transmission medium such as local area networks, the Internet, or digital satellite broadcasting.

In the computer, the programs can be installed into the storage block 508 through the input/output interface 505 by loading the removable medium 511 on the drive 510. In addition, the programs can be installed in the storage block 508 by receiving the programs through the communication block 509 via wired or wireless transmission medium. Otherwise, the programs can be installed in the ROM 502 or the storage block 508 in advance.

It should be noted that the programs to be executed by the computer may be executed in a time series along the sequence described herein, in parallel to each other, or on an as-demanded basis when it is called or the like.

It should also be noted that, herein, the steps describing each of the programs recorded to recording medium include not only the processing operations to be executed in a time series along the sequence described herein but also, even if not always executed in time series, the processing operations that are executed in parallel or individually.

It should be noted that, herein, a system denotes an entire apparatus configured by two or more devices (or apparatuses).

It should also be noted that the above-mentioned configuration described as one apparatus (or one processing block) may be divided and resultant two or more apparatuses (or two or more processing blocks) may provide a configuration, and vice versa. Conversely, other configurations than described above may obviously be added to the configuration of each apparatus (or each processing block). In addition, if the configuration and operation as an entire system is substantially the same, a part of the configuration of a certain apparatus (or a certain processing block) may be included in the configuration of another apparatus (or another processing block). That is, the present technology is not restricted to the embodiment described above and therefore various changes and variations to the above-mentioned embodiment are practicable within the scope of the substance of the present technology.

While preferred embodiments of the present disclosure have been specifically described with reference to the drawings, the present disclosure is not limited to the embodiments described above. It is obvious that person with an ordinary skill in the art to which the disclosure pertains can conceive various changes and modifications without departing from the spirit or scope of the following claims. Also these various changes and modifications may also fall within the scope of the present disclosure.

It should be noted that the present technology can also take the following configuration.

(1) An image processing apparatus including:
an image processing block configured to execute processing related with focusing on the basis of object area information indicative of an area corresponding to a plurality of objects in an image and designated focus position information indicative of a designated focus position in the image.

(2) The image processing apparatus according to (1) above, in which
the plurality of objects include a main object and a background.

(3) The image processing apparatus according to (1) above, in which
the plurality of objects include at least two similar objects.

(4) The image processing apparatus according to any one of (1) through (3) above, in which
the image processing block executes processing of estimating a background area as the processing related with focusing.

(5) The image processing apparatus according to any one of (1) through (4) above, in which
the image processing block identifies the designated focus position as the processing related with focusing.

(6) The image processing apparatus according to any one of (1) through (5) above, in which
if the designated focus position is positioned in a background area, the image processing block corrects the designated focus area to be an area of a main object among the plurality of objects as the processing related with focusing.

(7) The image processing apparatus according to any one of (1) through (6) above, in which
the image processing block generates an object frame that encloses an area of the designated focus position as the processing related with focusing.

(8) The image processing apparatus according to any one of (1) through (7) above, further including:
an area partition block configured to partition an input image into areas related with the plurality of objects on the basis of color boundary.

(9) The image processing apparatus according to any one of (1) through (8) above, in which
the object area information is indicative of an area related with the plurality of objects in the image partitioned by color boundary.

(10) The image processing apparatus according to any one of (1) through (9) above, in which
the designated focus position information is indicative of a position of a point included in a local focus area selected in the image.

(11) An image processing method including:
executing, by an image processing apparatus, processing related with focusing on the basis of object area information indicative of an area corresponding to a plurality of objects in an image and designated focus position information indicative of a designated focus position in the image.

REFERENCE SIGNS LIST

10 . . . Imaging apparatus, 100 . . . Lens unit, 101 . . . Imaging device, 102 . . . Image processing block, 103 . . . Control block, 104 . . . Display block, 106 . . . Recording device, 107 . . . Manipulation block, 121 . . . Superpixel generation block, 122 . . . Object frame generation block, 131 . . . Input image, 132 . . . Intermediately processed image, 133 . . . Object frame image, 141 . . . Background estimation block, 142 . . . Starting point correction block, 143 . . . Superpixel coupling block, 144 . . . Candidate frame generation block, 151 . . . Background estimation image, 152 . . . Starting point corrected image

The invention claimed is:
1. An image processing apparatus comprising:
an image processing block that is electrically connectable to an imaging device in a manner that permits the image processing block to electronically receive, from the imaging device, an input image, wherein the image processing block is configured to:

apply, when the image processing block converts the input image into an intermediately processed image, object area information that identifies areas of the input image where objects are situated in the input image, apply, when the image processing block converts the intermediately processed image into an object frame image, designated focus position information that identifies an initial point in the input image, and position, in a main object when the image processing block determines that the initial point is in a background area, the initial point, wherein:

the background area is where a background is situated in the input image, one of the areas is the background area, and one of the objects is the background.

2. The image processing apparatus according to claim 1, wherein the main object is another one of the objects.

3. The image processing apparatus according to claim 1, wherein the initial point is a local focus area.

4. The image processing apparatus according to claim 3, wherein the local focus area is a focus point.

5. The image processing apparatus according to claim 1, wherein the image processing block is configured to generate a background estimation image from the intermediately processed image, the background estimation image comprises the background area.

6. The image processing apparatus according to claim 1, wherein the object area information is indicative of an area related with the objects in the image partitioned by color boundary.

7. The image processing apparatus according to claim 1, wherein the object frame encloses an area of the initial point.

8. The image processing apparatus according to claim 1, wherein the object frame image is viewable on a display block.

9. The image processing apparatus according to claim 1, wherein the input image is an analog signal.

10. The image processing apparatus according to claim 1, wherein the intermediately processed image is in digital form.

11. The image processing apparatus according to claim 1, wherein the object frame image is in digital form.

12. The image processing apparatus according to claim 1, wherein the imaging device is configured to photoelectrically convert an optical image into the input image.

13. An image processing method comprising:

receiving, by an image processing block from an imaging device, an input image;

applying, by the image processing block when the image processing block converts the input image into an intermediately processed image, object area information that identifies areas of the input image where objects are situated in the input image;

applying, by an image processing block when the image processing block converts the intermediately processed image into an object frame image, designated focus position information that identifies an initial point in the input image; and positioning, in a main object by the image processing block when the image processing block determines that the initial point is in a background area, the initial point, wherein:

the background area is where a background is situated in the input image, one of the areas is the background area, and one of the objects is the background.

14. The image processing method according to claim 13, wherein the main object is another one of the objects.

15. The image processing method according to claim 13, wherein the imaging device photoelectrically converts an optical image into the input image.

16. The image processing method according to claim 13, further comprising:

displaying, by a display block, the object frame image.

17. The image processing method according to claim 13, wherein the initial point is a local focus area.

18. The image processing method according to claim 17, wherein the local focus area is a focus point.

19. The image processing method according to claim 13, further comprising:

generating, by the image processing block, a background estimation image from the intermediately processed image, wherein the background estimation image comprises a background area.

* * * * *